G. MATSON.
RAT TRAP.
APPLICATION FILED OCT. 16, 1913.
1,122,291.
Patented Dec. 29, 1914.
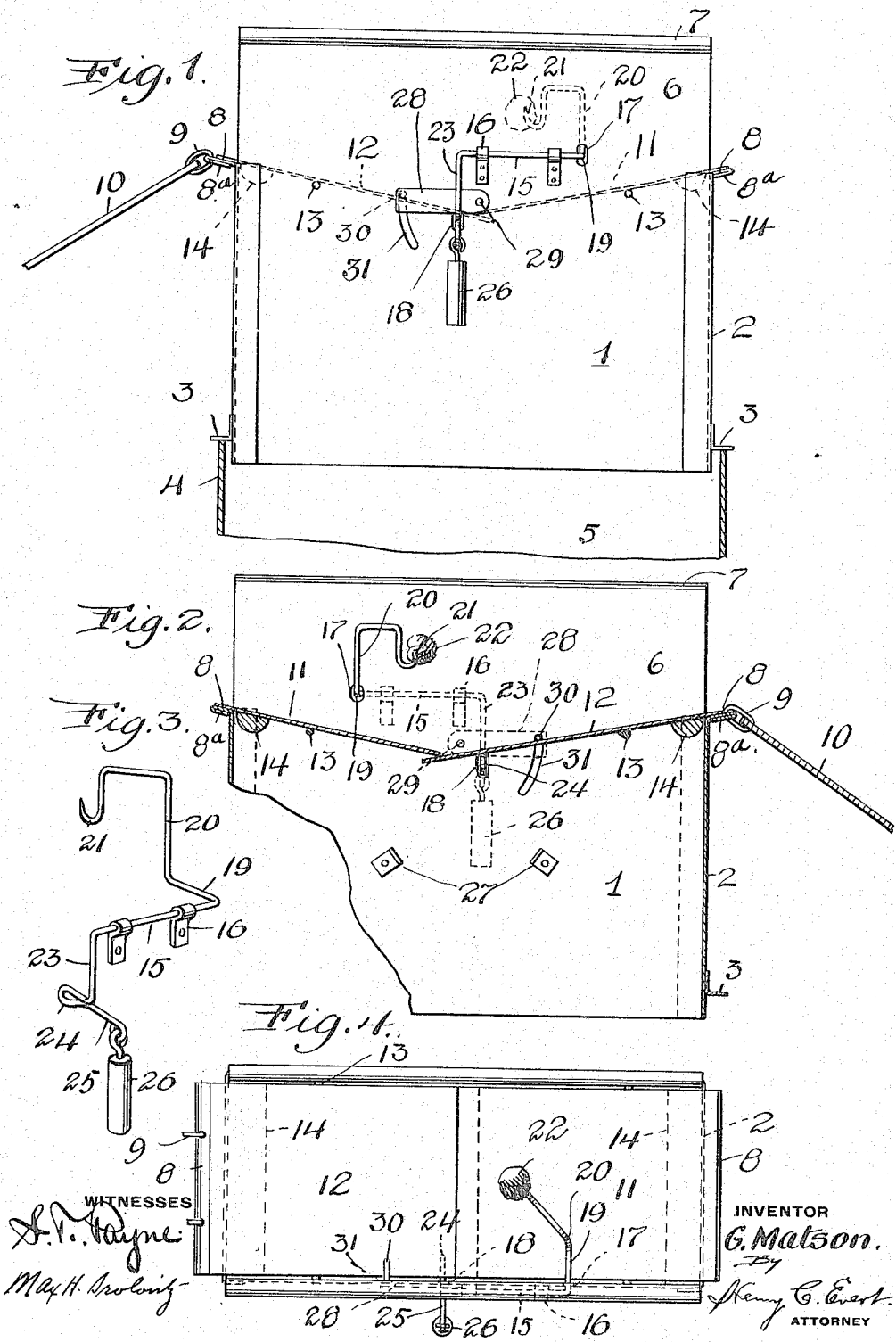
WITNESSES
INVENTOR
G. Matson.
ATTORNEY

UNITED STATES PATENT OFFICE.

GUSTAF MATSON, OF DAISYTOWN, PENNSYLVANIA.

RAT-TRAP.

1,122,291.   Specification of Letters Patent.   Patented Dec. 29, 1914.

Application filed October 16, 1913. Serial No. 795,522.

*To all whom it may concern:*

Be it known that I, GUSTAF MATSON, a subject of the Czar of Russia, residing at Daisytown, in the county of Washington and State of Pennsylvania, have invented certain new and useful Improvements in Rat-Traps, of which the following is a specification, reference being had therein to the accompanying drawing.

This invention relates to rat traps, and has for its object to provide a device of such class, which is simple in its construction and arrangement, strong, durable, efficient in its use, actuated by the weight of a rodent whereby the latter will be precipitated into a trapping compartment, readily set up and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In describing the invention in detail, reference is had to the accompanying drawing in which, Figure 1 is a side elevation of a trap in accordance with this invention showing the adaptation thereof with respect to a trapping compartment, Fig. 2 is a longitudinal sectional view, broken away, Fig. 3 is a perspective view of the combined bait and platform holder, and Fig. 4 is a top plan view of the trap.

Referring to the drawings in detail, 1 denotes a rectangular shell open at its top and bottom and having each of its end walls 2 provided near the bottom thereof with an angle bracket 3, the latter being secured to the outer face of its respective end wall and constitutes a support for engagement with the top edge of a receptacle 4, the latter constituting a trapping compartment 5, which may be filled with water if desired for the purpose of drowning the rodent. The angle brackets 3 suspend the shell 1 at the top of the trapping compartment 5 and said shell 1 extends slightly into the receptacle 4.

Each of the side walls 6 of the shell 1 is of a greater height than the other of the end walls 2 and the top edge of each of said side walls 6 is rounded as at 7. Each of the end walls 2 has its upper portion bent outwardly and upon itself as at $8^a$, to provide a transversely extending ledge 8 and to one of said ledges is connected through the medium of the links 9 a gang-plank 10. The ledges 8 constitute the supports for the outer ends of a pair of oppositely disposed inclined tiltable platforms 11 and 12. Platforms 11 and 12 are arranged between the side walls of the shell 1 below the top of said walls and mounted in the said side walls 6 are transverse rods 13 to which are pivotally connected the platforms 11 and 12.

The platform 12 is of greater length than the platform 11 and has its inner end extending under the inner end of the said platform 11, and each of said platforms when in normal position, normal position being when the inner ends of the platforms overlap, extend upon the ledges 8. Each of the platforms is provided with a counter weight 14 for maintaining the platforms in normal position.

The platform 12 is what may be termed the entrance platform, that is to say, the rodent travels up the gang-plank 10 and passes down the platform 12 and the rodent's weight overbalancing the weight 14 will tilt the platform 12 and the latter will release the platform 11 allowing it to tilt, under such conditions precipitating the rodent into the trapping compartment. The ledges 8 furthermore constitute a stop to arrest the tilting movement of the platforms due to the action of the weights 14. The platform 12 is held in normal position through the medium of a combined counterbalanced bait and platform holder, which will now be referred to. Said holder includes a longitudinally extending rock shaft 15, which is mounted in the bearing brackets 16 arranged exteriorly of one of the side walls and the said side wall is formed with an opening 17 arranged above the platform 11 and an opening 18 arranged below the platform 12. The shaft 15 is positioned above the platform. The rear end of the shaft 15 is provided with a crank 19 which extends through the opening 17 and terminates in a bait holding arm 20, the latter including a hook 21 for securing the bait 22. The bait 22 is positioned over the platform 11 and rearwardly with respect to the platform 12. The forward end of the shaft 15 terminates in a crank 23, which is disposed at right angles with respect to the crank 19 and terminates in a trip arm 24, the latter extending through the opening 18 and normally supporting the inner end of the platform 12. Projecting outwardly from the trip arm 24, is a hanger 25 carrying a counterweight 26.

The rodent attacking the bait 22 will rock the shaft 15, whereby the trip arm 24 is swung outwardly permitting of the platforms 11 and 12 to tilt, under such conditions precipitating the rodent into the trapping compartment 5. The downward tilting movement of the platforms 11 and 12 is limited by the stops 27.

To prevent the arm 24 swinging in through the opening 18 and above the platform 12, a shield 28 is pivotally connected as at 29, to that wall provided with the openings 17 and 18, and the normal position of the shield 28 is as illustrated in Fig. 1, the shield being supported in such position by the arm 24. When the arm 24 is swung out of the opening 18, the shield 28 drops down and closes said opening 18, preventing the entrance of the arm 24 until the shield 28 is elevated. The shield 28 is elevated through the medium of a pin 30 carried by one end of the shield and projecting through a segment-shaped slot 31 formed in that side wall 6 providing the openings 17 and 18.

The pin 30 normally rests upon the platform 12 and also in the path of said platform 12 when the latter assumes its normal position. When the platform 12 elevates, it engages the pin 30, elevates the shield 28 and causes the shield to clear the opening 18 so that the arm 24 can enter said opening and support the platform 12.

What I claim is:—

A rat trap comprising a shell adapted to communicate with the trapping compartment, a pair of tilting platforms arranged within said shell, having a combined counterbalanced bait and platform holder adapted when shifted in one direction to release said platforms whereby these latter can be tilted by the weight of a rodent to cause the precipitating of the latter through said shell, said holder pivotally mounted exteriorly of one of the side walls of said shell and extending through the said side wall above the platform and below one of the platforms, and a shield to prevent said holder from returning to normal position until the platforms assume their normal position.

In testimony whereof I affix my signature in the presence of two witnesses.

GUST. MATSON.

Witnesses:
L. L. BANE,
JOHN LAZZOR.

Copies of this patent may be obtained for five cents each, by addressing the "Commissioner of Patents, Washington, D. C."